(12) United States Patent
Lee et al.

(10) Patent No.: US 8,872,774 B2
(45) Date of Patent: Oct. 28, 2014

(54) METHOD FOR CORRECTING AND RECORDING INITIAL TOUCH POINTS ON TOUCH PANEL

(75) Inventors: Ping-Hwan Lee, Hsin-Chu (TW);
Yu-Min Hsu, Hsin-Chu (TW);
Yung-Tse Cheng, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 759 days.

(21) Appl. No.: 13/100,306

(22) Filed: May 4, 2011

(65) Prior Publication Data
US 2011/0316795 A1 Dec. 29, 2011

(30) Foreign Application Priority Data

Jun. 24, 2010 (TW) ................................ 99120585 A

(51) Int. Cl.
*G06F 3/041* (2006.01)
(52) U.S. Cl.
CPC ............ *G06F 3/0414* (2013.01); *G06F 3/0418* (2013.01)
USPC .......................... 345/173; 345/174; 178/18.01
(58) Field of Classification Search
CPC .......... G06F 2203/04111; G06F 3/044; G06F 12/0246
USPC .......................................... 345/173; 711/203
See application file for complete search history.

(56) References Cited

U.S. PATENT DOCUMENTS

2007/0101096 A1* 5/2007 Gorobets ...................... 711/203
2007/0229468 A1* 10/2007 Peng et al. .................... 345/173

* cited by examiner

*Primary Examiner* — Quan-Zhen Wang
*Assistant Examiner* — Troy Dalrymple
(74) *Attorney, Agent, or Firm* — Winston Hsu; Scott Margo

(57) ABSTRACT

While correcting and recording initial touch points on a touch panel, a plurality of sensors on the touch panel are classified into a plurality of first sensing groups assigned with serial numbers, and a plurality of sensors of each the first sensing group are equally divided into a plurality of second sensing groups assigned with serial numbers. After detecting initial touch points on the touch panel, a plurality of headers are generated for the plurality of first sensing groups, and a data structure is generated for each of the sensors having detected initial touch points according to whether first sensing groups corresponding to the headers have the sensors having the detected initial touch points or not. At last, the initial touch points are filtered off from a plurality of detected touch points on the touch panel, according to initial touch point information recorded in loaded data structures.

12 Claims, 3 Drawing Sheets

METHOD FOR CORRECTING AND RECORDING INITIAL TOUCH POINTS ON TOUCH PANEL

BACKGROUND OF THE INVENTION

1. Field of the Invention

The present invention is related to a method for correcting and recording initial touch points on a touch panel, and more particularly, to a method that classifies sensors that detect touch points on the touch panel into groups and generates corresponding data structures to effectively correct and record initial touch points on the touch panel.

2. Description of the Prior Art

During a touch panel manufacturing process, pressure sensors may be embedded into a touch panel for lowering cost as well as reducing size of the touch panel. However, due to unpredictable factors such as component characteristic drift during processing, the pressure sensors embedded in the touch panel may detect touch points that should not exist, also known as initial touch points, when a user has not performed any valid touch actions. Initial touch points are likely to affect the accuracy of operating the touch panel, causing inconvenience to the user. Some touch panels utilize detecting mechanisms to locate initial touch points for increased accuracy. However, detecting all initial touch points requires a great amount of data processing, and memory is required for every pressure sensor to record whether each pressure sensor has detected initial touch points. Consequently, for touch panels which process touch points in real-time, response speed is severely slowed and a considerable amount of memory space is occupied. Issues of slowed response speed and large occupied memory space only get worse as size of the touch panel increases.

SUMMARY OF THE INVENTION

The present invention discloses a method for correcting initial touch points on a touch panel. The touch panel comprises a plurality of sensors, wherein each sensor detects a touch point on the touch panel. The method comprises classifying the plurality of sensors into a plurality of first sensing groups assigned sequential serial numbers; dividing a plurality of sensors of each first sensing group into a plurality of second sensing groups assigned sequential serial numbers, wherein each second sensing group comprises a same number of the sensors assigned sequential serial numbers; detecting initial touch points on the touch panel; configuring a plurality of headers corresponding to the plurality of first sensing groups; configuring a plurality of data structures corresponding to a header which corresponds to a first sensing group that has detected the initial touch points, each of the plurality of data structures corresponding to a sensor that has detected an initial touch point in the first sensing group, and each of the plurality of data structures recording a serial number of a corresponding second sensing group in the first sensing group and a sensor serial number of a sensor of the corresponding second sensing group; loading the plurality of headers and the plurality of data structures corresponding to each of the plurality of headers for determining a plurality of initial touch points on the touch panel; and filtering out the plurality of initial touch points from a plurality of detected touch points on the touch panel.

The present invention further discloses a method for recording initial touch points on a touch panel. The method comprises providing a touch panel comprising a plurality of sensors, each sensor utilized to detect a touch point on the touch panel; grouping the plurality of sensors into a plurality of first sensing groups assigned sequential serial numbers; equally dividing a plurality of sensors of each first sensing group into a plurality of second sensing groups assigned sequential serial numbers, wherein each second sensing group comprises a same number of the sensors assigned sequential serial numbers; detecting initial touch points on the touch panel; configuring a plurality of headers corresponding to the plurality of first sensing groups; and configuring a plurality of data structures corresponding to a header which corresponds to a first sensing group that has detected the initial touch points, each of the plurality of data structures corresponding to a sensor that has detected an initial touch point in the first sensing group, and each of the plurality of data structures recording a serial number of a corresponding second sensing group in the first sensing group and a sensor serial number of a sensor of the corresponding second sensing group.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a method for correcting and recording initial touch points on a touch panel. In the method, by utilizing a data structure of the present invention to arrange and classify sensors on the touch panel, so as to record location data of the initial touch points on the touch panel in advance, only a small amount of memory space is used to record the position or serial number of the sensors that have detected the initial touch points. In addition, relative data of the initial touch points can be accessed by loading the recorded position data of the initial touch points, when booting up the touch panel, which consumes little time for processing substantially reduced data quantity compared to the prior art.

Figure 1:
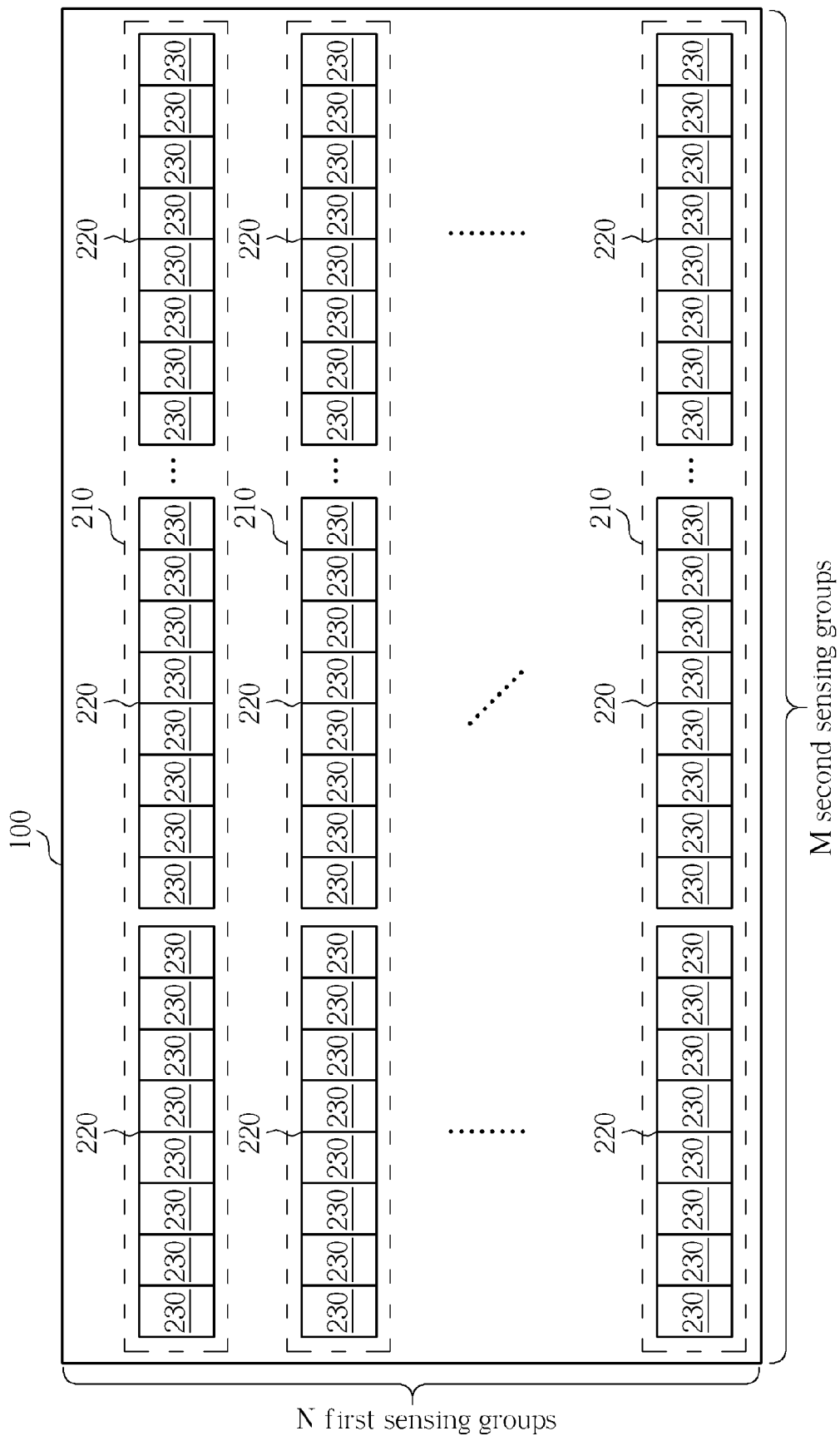
FIG. 1 is a diagram illustrating the classification and distribution of sensors on a touch panel.

Please refer to FIG. 1. FIG. 1 is a diagram illustrating the classification and distribution of sensors on a touch panel 100. As shown in FIG. 1, the touch panel 100 comprises a plurality of sensors 230 for sensing pressure. The sensors 230 are classified into a plurality of second sensing groups 220 in groups of 8 sensors 230. The plurality of second sensing groups 220 located at the same row on the touch panel 100 is classified into one first sensing group 210. Therefore, the touch panel 100 of FIG. 1 comprises N first sensing groups 210, and each first sensing group 210 comprises M second sensing groups 220. The magnitudes of variables M and N mentioned above are adjusted according to area of the touch panel 100 and resolution of the plurality of sensors 230. For instance, assuming the area of the touch panel 100 is 10.1 inches (10.1"), and the resolution of each sensor 230 is 256× 150, the values of M and N are "32" (which corresponds to 32×8=256 sensors 230 located at each row of the touch panel 100) and "150" respectively. Furthermore, other embodiments of the present invention are not limited to forming the plurality of second sensing groups 220 in groups of 8 sensors 230. In other words, classifying a number of sensors 230 other than 8 into one second sensing group 220 is also considered an embodiment of the present invention. In addition, a number of the first sensing groups 210 can be configured according to number of gate line driving units, e.g. the number of first sensing groups 210 equals the number of gate line driving units, but is not limited to this.

Figure 2:
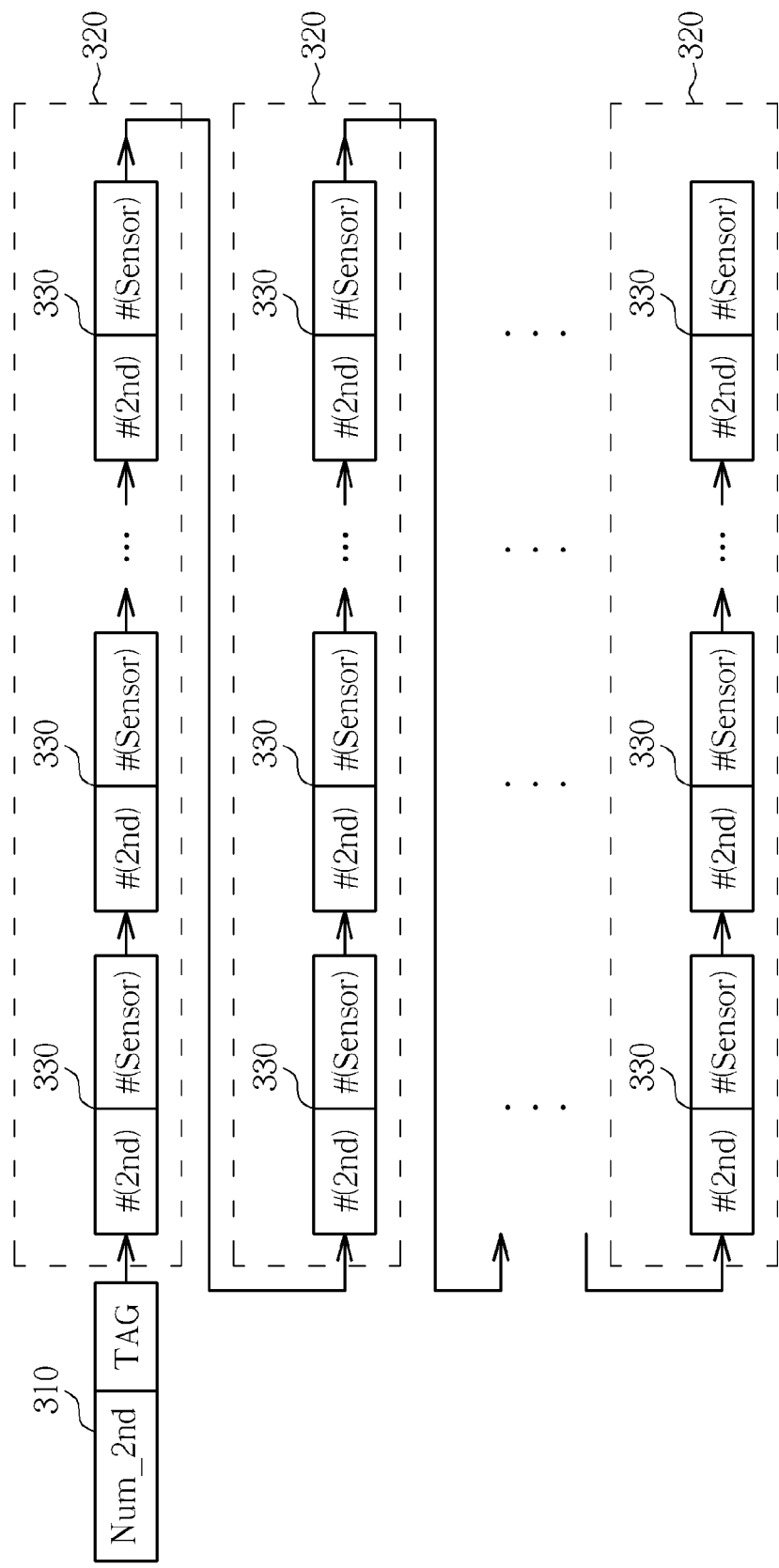
FIG. 2 is a diagram illustrating data structure of one single first sensing group of the touch panel shown in FIG. 1

Please refer to FIG. 2. FIG. 2 is a diagram illustrating data structure of one single first sensing group 210 of the touch panel 100 shown in FIG. 1, for indicating conditions such as whether each first sensing group 210 shown in FIG. 1 has detected any initial touch points, and the number of initial touch points detected by each first sensing group. As shown in FIG. 2, a header 310 corresponds to one single first sensing group 210 of FIG. 1. The header 310 comprises a second sensing group number field Num_2nd and a tag field TAG. The second sensing group number field Num_2nd represents a number of second sensing groups, located in the single first sensing group 210, that have detected the initial touch point. The tag field TAG represents whether the single first sensing group 210 comprises any second sensing groups 220 that have detected initial touch points.

In one embodiment of the present invention, the second sensing group number field Num_2nd and the tag field TAG are represented in a binary form. For instance, when the single first sensing group 210 comprises 30 second sensing groups 220 that have detected the initial touch point, value of the second sensing group number field Num_2nd is "11110", and value of the tag field TAG is "1" to represent the single first sensing group 210 comprises at least one second sensing group 220 that has detected the initial touch point.

The header 310 links and manages a plurality of data structures 330 by utilizing methods such as a linked list and/or pointers. For illustrating the relation between components of touch panel 100 in FIG. 1 and the data structure in FIG. 2, the plurality of data structures 330 in FIG. 2 is further classified into a plurality of data structure groups 320 according to the plurality of sensors 230 comprised by the plurality of second sensing groups 220. The plurality of data structure groups 320 corresponds to the plurality of second sensing groups 220 in the single first sensing group 210. However, the classifying step of the plurality of data structure groups 320 is selectively performed when practicing the method of the present invention. A single data structure group 320 comprises a plurality of data structures 330 linked by methods such as a linked list and/or pointers. The plurality of data structures 330 corresponds to the plurality of sensors 230 in the single second sensing group 220. As shown in FIG. 2, one single data structure 330 comprises at least two fields: one field is the second sensing group serial number field #(2nd) for representing the serial number of the second sensing group 220, which comprises the sensor 230 corresponding to the single data structure 330 in the corresponding first sensing group 210; and the other field is the sensor serial number field #(Sensor) for representing the serial number of the sensor 230, which corresponds to the single data structure 330 in the second sensing group 220. For instance, when the serial number of a single second sensing group 220 in a first sensing group 210 is "28", and three sensors 230 with serial numbers "1", "3" and "6" respectively in the single second sensing group 220 have detected initial touch points, three data structures 330 corresponding to the three sensors 230 are generated. The values of the second sensing group serial number fields #(2nd) of the three data structures 330 are all "28" (or "11100" in binary form), and the values of the sensor serial number field #(Sensor) of the three data structures 330 are "1", "3" and "6" (or "001", "011" and "110" in a binary form) respectively. Furthermore, the existence of one single data structure 330 means the existence of a single initial touch point on the touch panel 100, so the location data of the single initial touch point on the touch panel 100 is recorded in the single data structure 330.

The methods for linking and managing data structures shown in FIG. 2 are not limited to methods such as the linked list or pointers mentioned above, so embodiments of data structure that are linked and managed through different methods are still within the scope of the present invention. Additionally, the single first sensing group 210 in linked list form shown in FIG. 2 can also be represented by one continuous bit string in memory, as long as the bit number for each header 310 and different fields of each data structure 330 are planned out appropriately in advance.

Figure 3:
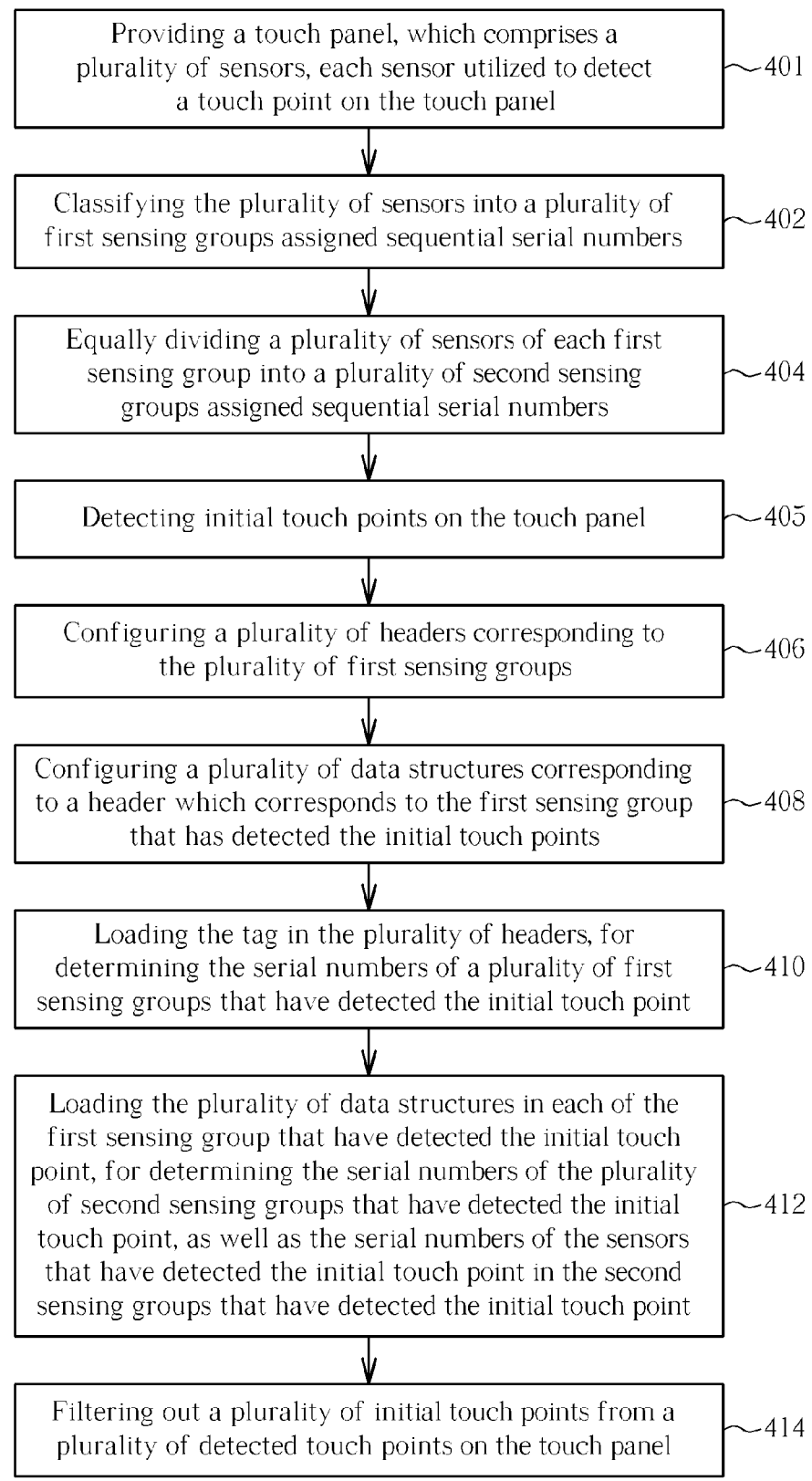
FIG. 3 is a flow chart illustrating a method of recording and correcting initial touch points on a touch panel of the present invention and the relative loading steps thereof.

Please refer to FIG. 3. FIG. 3 is a flowchart illustrating a method of recording and correcting initial touch points on a touch panel of the present invention and the relative loading steps thereof. The method of recording and correcting initial touch points on the touch panel comprises the following steps:

Step 401: providing a touch panel, which comprises a plurality of sensors, each sensor utilized to detect a touch point on the touch panel;

Step 402: classifying the plurality of sensors into a plurality of first sensing groups assigned sequential serial numbers, in which each first sensing group comprises a plurality of sensors;

Step 404: equally dividing a plurality of sensors of each first sensing group into a plurality of second sensing groups assigned sequential serial numbers, in which each second sensing group comprises same number of sensors assigned sequential serial numbers;

Step 405: detecting initial touch points on the touch panel;

Step 406: configuring a plurality of headers corresponding to the plurality of first sensing groups, each header recording the number of second sensing groups that have detected the initial touch points in the corresponding first sensing group, each header also recording a tag indicating whether the first sensing group has detected the initial touch points;

Step 408: configuring a plurality of data structures corresponding to a header which corresponds to the first sensing group that has detected the initial touch points, the plurality of data structures corresponding respectively to the plurality of sensors that have detected the initial touch points in the first sensing group, and each data structure recording the serial number of the corresponding second sensing group in the first sensing group, as well as the sensor serial number of the sensor of the corresponding second sensing group;

Step 410: loading the tag in the plurality of headers for determining the serial numbers of the plurality of first sensing groups that have detected the initial touch point;

Step 412: loading the plurality of data structures in each of the first sensing group that have detected the initial touch point for determining the serial numbers of the plurality of second sensing groups that have detected the initial touch point, as well as the serial numbers of the sensors that have detected the initial touch point in the second sensing groups that have detected the initial touch point; and Step 414: filtering out a plurality of initial touch points from a plurality of detected touch points on the touch panel.

Steps 401-404 describe the method of classifying pressure sensors of FIG. 1, in which a plurality of sensors 230 in a same second sensing group 220 is sequentially assigned with serial numbers, a plurality of second sensing groups 220 in a same first sensing group 210 is sequentially assigned with serial numbers, and a plurality of first sensing groups 210 on the touch panel 100 is sequentially assigned with serial numbers. Taking FIG. 1 as an example and assuming the values of M and N are "32" and "150" respectively, the eight sensors 230 in the same second sensing group 220 can be numbered as "1" to "8", the 32 second sensing groups 220 in the same first sensing group 210 can be numbered as "1" to "32", and the 150 first sensing groups 210 on the touch panel 100 can be numbered as "1" to "150".

Steps 405-408 describe the process of firstly detecting initial points during a short period of time of the touch panel 100 booting up, and then establishing data structure for recording initial touch points as shown in FIG. 2. In Step 406, a header (as shown in FIG. 2) is generated for each first sensing group 210 on the touch panel 100, according to results of detecting for initial touch points on the touch panel 100. In step 408, a number of data structures 330 are generated according to the same number of sensors 230 that have detected initial touch points in one single first sensing group 210, as shown in FIG. 2. In other words, each data structure group 320 in FIG. 2 may comprise a different number of data structures 330. This way, the header 310, which corresponds to at least one first sensing group 210 that have detected the initial touch point, is linked to at least one data structure 330; otherwise no data structures 330 are available to be linked. At this point, the process for recording initial touch points on the touch panel 100 is completed.

Steps 410-412 describe the process of loading location data of the plurality of initial touch points recorded in the recording process mentioned above. In step 410, the touch panel 100 firstly reads the header 310 as shown in FIG. 2, for determining which first sensing group 210 has detected initial touch points according to the tag field TAG. The touch panel 100 also determines a number of second sensing groups 220 that have detected initial touch points in the first sensing groups 210 that have detected initial touch points, according to the respective second sensing group number field Num_2nd in the at least one data structure 330 linked by the header 310. It is noted that, according to the above descriptions, the value of second sensing group number field Num_2nd is equal to or less than the total number of linked data structures 330, since one single second sensing group 220 comprises at least one sensor 230 that has detected the initial touch point. In step 412, the plurality of data structures 330 linked by the header 310 are then loaded for extracting data relative to each sensor 230 that has detected the initial touch point.

Lastly in step 414, touch points detected by sensors 230 relative to the initial touch points are filtered out according to relative location data of sensors that have detected initial touch points in steps 410-412, for maintaining the accuracy of the touch panel 100 in detecting touch points.

According to the condition where the value of N is "150", as mentioned above, since in steps 410-412, only 150 headers 310 and data structures 330 relative to headers that comprise initial touch points are required to be processed, data processing for first sensing groups 210 that have not detected initial touch points is saved. For instance, assuming only three first sensing groups 210 in the 150 first sensing groups 210 have detected initial touch points, the data processing of the other 147 first sensing groups 210 is substantially reduced to mere loading of 147 headers 310. This way, for touch panels which require instantaneous response to touch points, the response speed is significantly increased when processing touch points.

It is noted that embodiments generated by adding conditions mentioned above to each step of FIG. 3, and/or by applying reasonable arrangement combinations are also considered embodiments of the present invention.

The present invention discloses a method for recording and correcting initial touch points on a touch panel. By utilizing the method of the present invention, touch panels with pressure sensors installed can quickly detect initial touch points during boot-up, and utilize less memory to record location data of sensors that have detected initial touch points. Furthermore, the location data of sensors that have detected initial touch points can be loaded quickly in later usage of the touch panels, and substantial data processing relative to the sensors that have not detected initial touch points can be saved.

Those skilled in the art will readily observe that numerous modifications and alterations of the device and method may be made while retaining the teachings of the invention.

What is claimed is:

1. A method for correcting initial touch points on a touch panel, the touch panel comprising a plurality of sensors, wherein each sensor detects a touch point on the touch panel, the method comprising:
   classifying the plurality of sensors into a plurality of first sensing groups assigned sequential serial numbers;
   dividing a plurality of sensors of each first sensing group into a plurality of second sensing groups assigned sequential serial numbers, wherein each second sensing group comprises a same number of the sensors assigned sequential serial numbers;
   detecting initial touch points on the touch panel;
   configuring a plurality of headers corresponding to the plurality of first sensing groups;
   configuring a plurality of data structures corresponding to a header which corresponds to a first sensing group that has detected the initial touch points, each of the plurality of data structures corresponding to a sensor that has detected an initial touch point in the first sensing group, and each of the plurality of data structures recording a serial number of a corresponding second sensing group in the first sensing group and a sensor serial number of a sensor of the corresponding second sensing group;
   loading the plurality of headers and the plurality of data structures corresponding to each of the plurality of headers for determining a plurality of initial touch points on the touch panel; and
   filtering out the plurality of initial touch points from a plurality of detected touch points on the touch panel, wherein each of the plurality of headers records a number of second sensing groups that have detected the initial touch points in a corresponding first sensing group, and a tag indicating whether the corresponding first sensing group has detected the initial touch points.

2. The method of claim 1, wherein the number of second sensing groups that have detected the initial touch points in the corresponding first sensing group and the tag are represented in a binary form.

3. The method of claim 1, wherein each of the plurality of first sensing groups comprises a same number of second sensing groups.

4. The method of claim 1, wherein a number of the plurality of first sensing groups and a number of the plurality of second sensing groups in each of the plurality of first sensing groups are determined according to a resolution of the plurality of sensors which are for detecting touch points on the touch panel.

5. The method of claim 1, wherein the serial number of the corresponding second sensing group in the first sensing group and the sensor serial number of the sensor of the corresponding second sensing group recorded by each of the plurality of data structures are represented in a binary form.

6. The method of claim 1, wherein loading the plurality of headers and the plurality of data structures corresponding to each of the plurality of headers for determining the plurality of initial touch points on the touch panel comprises:
   loading a tag in the plurality of headers for determining serial numbers of the plurality of first sensing groups that have detected the initial touch points; and
   loading the plurality of data structures in each of the first sensing groups that have detected the initial touch points for determining serial numbers of the plurality of second sensing groups that have detected the initial touch points and the sensor serial numbers of sensors that have detected the initial touch point in the second sensing groups that have detected the initial touch points.

7. A method for recording initial touch points on a touch panel, comprising:
   providing a touch panel comprising a plurality of sensors, each sensor utilized to detect a touch point on the touch panel;
   grouping the plurality of sensors into a plurality of first sensing groups assigned sequential serial numbers;
   equally dividing a plurality of sensors of each first sensing group into a plurality of second sensing groups assigned sequential serial numbers, wherein each second sensing group comprises a same number of the sensors assigned sequential serial numbers;
   detecting initial touch points on the touch panel;
   configuring a plurality of headers corresponding to the plurality of first sensing groups; and
   configuring a plurality of data structures corresponding to a header which corresponds to a first sensing group that has detected the initial touch points, each of the plurality of data structures corresponding to a sensor that has detected an initial touch point in the first sensing group, and each of the plurality of data structures recording a serial number of a corresponding second sensing group in the first sensing group and a sensor serial number of a sensor of the corresponding second sensing group, wherein each of the plurality of headers records a number of second sensing groups that have detected the initial touch points in a corresponding first sensing group and a tag indicating whether the corresponding first sensing group has detected the initial touch points.

8. The method of claim 7, wherein the number of second sensing groups that have detected the initial touch points in the corresponding first sensing group and the tag are represented in a binary form.

9. The method of claim 7, wherein each of the plurality of first sensing groups comprises a same number of second sensing groups.

10. The method of claim 7, wherein a number of the plurality of first sensing groups and a number of the plurality of second sensing groups in each of the plurality of first sensing groups are determined according to a resolution of the plurality of sensors which are for detecting touch points on the touch panel.

11. The method of claim 7, wherein the serial number of the corresponding second sensing group in the first sensing group and the sensor serial number of the sensor of the corresponding second sensing group recorded by each of the plurality of data structures are represented in a binary form.

12. The method of claim 7, wherein the step of grouping the plurality of sensors into a plurality of first sensing groups comprises grouping the plurality of sensors arranged at one row into one first sensing group.

* * * * *